United States Patent [19]

Hayashida et al.

[11] Patent Number: 4,945,729
[45] Date of Patent: Aug. 7, 1990

[54] TANDEM MASTER CYLINDER SLEEVE

[75] Inventors: Yoshihiro Hayashida, Kanagawa; Yoshihiro Nakamura, Yamanashi; Hideaki Ishii, Chiba; Naganori Koshimizu, Yamanashi, all of Japan

[73] Assignee: Tokico Ltd., Kawasaki, Japan

[21] Appl. No.: 361,867

[22] Filed: Jun. 6, 1989

[30] Foreign Application Priority Data

Jun. 10, 1988 [JP] Japan ............................. 63-77129[U]
Nov. 18, 1988 [JP] Japan ............................. 63-150620[U]
Nov. 18, 1988 [JP] Japan ............................. 63-150621[U]

[51] Int. Cl.$^5$ ............................................. B60T 11/20
[52] U.S. Cl. ........................................ 60/562; 60/588; 92/171.1
[58] Field of Search ................. 60/562, 588; 92/169.1, 92/171.1

[56] References Cited

U.S. PATENT DOCUMENTS

| 4,510,752 | 4/1985 | Gaiser ................................... 60/562 |
| 4,514,982 | 5/1985 | Bach et al. ........................... 60/562 |
| 4,527,395 | 7/1985 | Gaiser et al. ................... 92/171.1 X |
| 4,878,346 | 11/1989 | Metzelfeld et al. ............ 92/171.1 X |

Primary Examiner—Edward K. Look
Assistant Examiner—George Kapsalas
Attorney, Agent, or Firm—Wenderoth, Lind & Ponack

[57] ABSTRACT

A master cylinder in which a sleeve is provided inside a cylinder main body to define a first pressure chamber in cooperation with primary and secondary pistons. A plurality of through-holes adapted to communicate with an outlet port are disposed in the sleeve in such a manner as to be longitudinally spaced away from each other. positioning means is provided between the sleeve and the cylinder main body for positioning the sleeve with respect to the circumferential direction relative to the cylinder main body. The sleeve is positioned relative to the cylinder main body in such a manner that at least one of the plurality of through-holes adapted to establish communication between the outlet port and the first pressure chamber when the pistons are at their rearmost positions is located to face the top portion of the circumferential wall of the cylinder main body.

3 Claims, 2 Drawing Sheets

TANDEM MASTER CYLINDER SLEEVE

BACKGROUND OF THE INVENTION

1. Field of the Invention

The present invention relates to a tandem-type master cylinder having two pressure chambers, and more particularly to a master cylinder in which a first pressure chamber is formed between primary and secondary pistons in a sleeve which is inserted and disposed in the cylinder main body.

2. Prior Art

A tandem-type master cylinder having two pressure chambers is one of the options for use with the automobile brake systems. There are two types of twin-pressure-chambered tandem-type master cylinders: in one type, cup seals are provided on the pistons, while in the other, they are provided on the cylinder main body. The latter is advantageous in design of a compact master cylinder, in which cup seals are designed to be held by a sleeve inserted in the cylinder main body for mounting therein.

Japanese Patent Public Disclosure No. 16952/1983 which corresponds to U.S. Pat. No. 4,510,752 discloses a master cylinder of this type. In this master cylinder, a primary cup and secondary cup are held between the internal wall of the cylinder main body and either end of a sleeve inserted in the same, respectively. Moreover, a first pressure chamber is formed between two pistons in the sleeve, and a secondary pressure chamber between the distal end of the cylinder main body and one of the two pistons, a secondary piston. In addition, two inlet ports and two outlet ports are provided on the cylinder main body through the circumferential wall thereof in such a manner as to connect the two pressure chambers, respectively, to a brake fluid reservoir and to wheel cylinders, and a through-hole is provided on the sleeve, communicating with one of the outlet ports on one side and with the first pressure chamber on the other side. This through-hole is elongated longtudinally of the sleeve lest it should be completely closed by the piston during the reciprocating movement of the piston. Return springs for returning the pistons to their normal positions are designed to be lodged in holes formed in the respective pistons to accommodate them, and this also serves to make the master cylinder more compact.

A master cylinder of this type, however, tends to offer a lower degree of mechanical strength of the sleeve due to the presence of the elongated through-hole formed in the sleeve. Moreover, although it is ideal to locate the elongated through-hole at a position facing the top portion of the circumferential wall of the cylinder main body in order to prevent air from remaining in the pressure chambers at the time when filing the brake system with brake fluid, it cannot be completely assured with such a prior art master cylinder that the sleeve is so positioned relative to the cylinder main body that the elongated through-hole will be located at the ideal position when the former is inserted in the latter. It is possible that the elongated through-hole may be located at a position facing the side of the circumferential wall of the cylinder main body, in which case air tends to remain in the pressure chambers.

SUMMARY OF THE INVENTION

The present invention has been contrived with a view to effectively solving the above-mentioned problems. An object of the invention is to improve the mechanical strength of the sleeve and hence the durability of a master cylinder. Another object of the invention is to prevent the generation of residual air in the pressure chambers.

In a master cylinder according to the present invention, a plurality of longitudinally spaced apart through-holes are provided on a sleeve forming a first pressure chamber between two pistons and itself. In addition, a means is also provided for positioning the sleeve in terms of the rotational direction relative to a cylinder main body, whereby at least one of the through-holes which functions to bring the first pressure chamber and its associated outlet port into communication with each other when the pistons are at their rearmost positions can be located at a position facing the top portion of the cylinder main body.

The mechanical strength of the master cylinder of the present invention is improved by disposing a plurality of small through-holes in the sleeve instead of providing one large through-hole. In addition, since these through-holes are longitudinally spaced away from each other in the sleeve, even when some of them are closed by the moving pistons, the remaining through-holes function to keep the first pressure chamber and its associated outlet port in communication with each other, thus making it possible to keep them in a state of communication at all times. Moreover, since the through-hole which functions to bring the first pressure chamber and its associated outlet port in communication with each other when the pistons are at their rearmost position is located at a position facing the top portion of the cylinder main body due to the utilization of the positioning means, it is possible to properly bleed the pressure chamber of entrapped air when the brake system is filled with brake fluid. It is also possible to fix the so located through-hole at such a position during an air-bleeding operation by restricting the rotation of the sleeve.

In one embodiment of the present invention, a cap is provided on the end of the cylinder main body to prevent the sleeve from coming off, and a positioning means is provided between the cylinder main body and sleeve for positioning the latter relative to the former. This positioning means comprises a screw adapted to be screwed into the cylinder main body in the radical direction thereof, whereby the sleeve is locked in place at its end and rotation of the sleeve is thus prevented. Moreover, the head of the screw is designed to be received in a hole formed in the cap so as not to protrude beyond the cap.

Futhermore, the master cylinder of this embodiment allows the screw to lock the sleeve, whereby the relevant through-hole can be fixed at a position facing the top portion of the circumferential wall of the cylinder main body during filling of the brake system with brake fluid, thus allowing bleeding of air from the pressure chamber to be conducted easily and effectively. This configuration also makes it possible to restrict rotation of the sleeve during an air-bleeding operation. In this case, the positioning screw is screwed into the cylinder main body radially relative to the same. This allows the thickness of the portion of the cylinder main body adjacent to the screw to be made uniform, local reduction in the thickness of the cylinder main body thus being prevented. In addition, since the head of the screw is received in a hole formed in the cap and is prevented from protruding beyond the cap, this embodiment is advantageous in providing space savings in terms of assembly of the master cylinder and brake booster.

In another embodiment of the present invention, the through-holes provided on the sleeve received in the cylinder main body are partly closed by a secondary piston during its normal reciprocating movement, and a constricted portion designed to increase the resistance to flow is formed in the through-hole that functions to bring the first pressure chamber and its associated outlet port into communication with each other when the secondary piston withdraws to its normal rearmost position.

With the master cylinder according to this embodiment, the resistance to flow between the first pressure chamber and its associated outlet port is designed to be increased by virtue of the constricted portion provided in the through-hole when the secondary piston is at its normal retracted position. This configuration allows the generation of damping action when brake fluid in the first pressure chamber is pressurized by the secondary piston and then caused to pass through the constricted portion, even when the pressure in a second pressure chamber outgrows that in the first one while filling the brake system with brake fluid. This allows the pressure in the first pressure chamber to be increased, thus making it possible to stop the secondary piston from withdrawings.

DETAILED DESCRIPTION OF THE PREFERRED EMBODIMENT

Referring to the accompanying drawings, embodiments of the master cylinder according to the present invention will now be described below.

Figure 1:
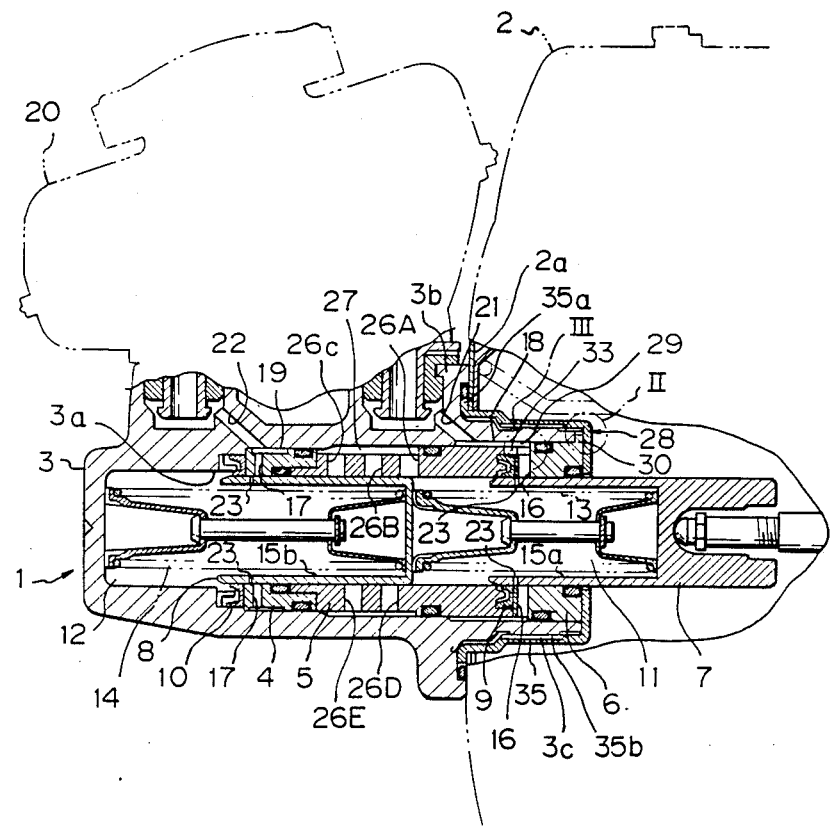
FIG. 1 is a vertical sectional view in the longitudinal direction showing a first embodiment of the master cylinder according to the present invention.
Figure 2:
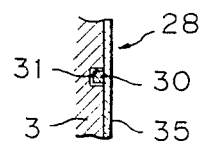
FIGS. 2 and 3 are horizontal sectional views of the parts encircled, respectively, by the dotted lines II and III in FIG. 1.
Figure 3:
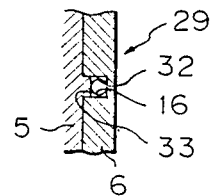

FIGS. 1 to 3 show a first embodiment of the present invention.

A master cylinder according to the first embodiment comprises a cylinder main body 3, a collar 4, a sleeve 5, a bearing member 6, primary and secondary pistons 7, 8 and primary and secondary cups 9, 10. The cylinder main body 3 is placed horizontally and connected to a brake booster 2. The collar 4, sleeve 5 and bearing member 6 are shaped like a ring and have the same inside diameter, and they are disposed in that order in the cylinder main body 3, as shown in FIG. 1. The primary and secondary pistons 7, 8 are adapted to slide along the internal circumferential walls of these members. The primary and seconday cups 9, 10 are disposed, respectively, between the rear end of the sleeve 5 and the bearing member 6, and between the stepped portion 3a formed on the internal wall of the cylinder main body 3 and the collar 4. The primary and secondary pistons 7, 8 and the sleeve 5 define a first pressure chamber 11, while the distal end of the cylinder main body 3 and the secondary piston 8 define a second pressure chamber 12. In addition, return springs 13, 14 for the respective pistons 7, 8 are designed to be received in holes 15a, 15b formed in the same for that purpose.

A plurality of intlet ports 16, 17 are provided on the bearing member 6 and collar 4, respectively, in such a manner as to be spaced away from each other in the circumferential direction on the respective components. These inlet ports 16, 17 are connected to their associated brake fluid feeding channels 21, 22 via their associated communicating chambers 18, 19 which are formed such as to extend along the full length of the circumference of the sleeve 5 and the collar 4, respectively, whereby the first and second pressure chambers 11, 12 are brought into communication with a brake fluid reservoir 20 via small holes 23 formed in the primary and secondary pistons 7, 8 respectively, when the pistons 7, 8 are at their retracted positions (positions shown in FIG. 1).

Outlet ports (not shown) for connecting the respective pressure chambers 11, 12 to their associated wheel cylinders (not shown) are provided at the upper portion of the circumferential wall of the cylinder main body 3 in such a manner as to extend therethrough. One of these outlet ports is adapted to communicate with the first pressure chamber 11 via a plurality of through-holes 26A–26E (five through-holes in this embodiment) formed in the circumferential wall of the sleeve 5. These through-holes 26A–26E are radially formed, and the through-holes 26A–26C and the through-holes 26D, 26E are formed at two diametrically opposed positions, i.e., positions deviating from each other by 180° in the circumferential direction of the sleeve. These through-holes are spaced away from each other in the longitudinal direction of the sleeve 5 at the respective positions so as not to align with each other in the longitudinal direction. The through-hole 26A is disposed at the rearmost position (on the extreme right in FIG. 1), which is further to the rear than the rearmost position of the secondary piston 8. Communication is ensured between the respective through-holes 26A–26E and the outlet port via a communicating chamber 27 defined by the outer and inner circumferential walls of the sleeve 5 and the cylinder main body 3. In the second pressure chamber, the inside diameter of the distal end of the cylinder main body 3 is made slightly larger than the outside diameter of the secondary piston 8, whereby communication is ensured between the chamber and the outlet port at all times during the movement of the secondary piston 8.

Positioning means 28, 29 are respectively provided between the proximate end of the cylinder main body 3 and the bearing member 6, and between the bearing member 6 and the sleeve 5. The positioning means 28 disposed between the cylinder main body 3 and the bearing member 6 comprises, as shown in FIG. 2, a projection 30 provided on the side of the bearing member 6 in succh a manner as to protrude radially outwardly therefrom and a groove 31 formed at the proximate end of the cylinder main body 3. On the other hand, the positioning means 29 disposed between the bearing member 6 and the sleeve 5 comprises, as shown in FIG. 3, and indentation 32 formed in the outer circumference of the bearing member 6 at its distal end and a projection 33 provided on the rear end of the sleeve 5 in such a manner as to longitudinally protrude therefrom. As shown in FIG. 1, the sleeve 5 is oriented by these positioning means 28, 29 such that the respective through-holes 26A-26E formed thereon are located at positions which allow them to face, respectively, the top and bottom portions of the circumferential wall of the cylinder main body 3. In addition, the sleeve 5 and bearing member 6 are positioned relative to each other in the cylinder main body 3 by the positioning means 28, 29 in such a manner that the rearmost through-hole 26A is located at a position facing the top portion of the circumferential wall of the cylinder main body 3. Since the postioning means 29 is designed to be disposed close to the inlet port 16 of the bearing member 6, the indentation 32 and inlet portion 16 are formed in such a manner as to communication with each other, and the projection 33 provided on the sleeve 5 is brought into engagement with the indentation 32 lest it should close the inlet port 16.

A cap 35 is mounted on the proximate end of the cylinder main body 3 to prevent the bearing member 6, the sleeve 5 and so forth from coming off the cylinder main body 3. The cap 35 and the cylinder main body 3 are screw fastened to each other at the respective threaded portions 35b, 3c. A flange 35a formed on the outer circumference of the cap 35 is designed to be held between a shell 2a of the brake booster 2 and a mounting flange 3b of the cylinder main body 3, displacement of the cap 35 from the cylinder main body 3 thus being prevented.

In the master cylinder configured as described above, pressurized fluid in the first pressure chamber 11 is designed to be fed from the through-holes 26A-26E provided on the sleeve 5 surrounding the chamber via the outlet port to its associated wheel cylinders, while pressurized fluid in the second pressure chamber 12 is fed to its associated wheel cylinders through the outlet port (not shown). As previously described, in this condition, the second pressure chamber 12 is in communication with the outlet port at all times, while the first pressure chamber 11 is in communication with the outlet port via the rearmost through-hole 26A in the initial stage in which the primary and secondary pistons 7, 8 are at their rearmost position with the remaining through-holes 26B-26E closed by the secondary piston 8. Afterwards, as the pistons 7, 8 move forward, these through-holes 26B-26E are opened in order, providing communication between the first pressure chamber 11 and the outlet port. On the other hand, even when the primary piston 7 is driven to its frontmost position, thereby closing the rearmost through-hole 26A, the communication between the first pressure chamber 11 and the outlet port can be maintained by the through-holes 26B-26E disposed at positions close to the front end of the cylinder main body 3 than the rearmost through-hole 26A. In other words, the first pressure chamber 11 is also designed to be kept in communication with the outlet port, regardless of the positions of the respective pistons 7, 8.

In the initial stage in which both pistons 7, 8 are at their rearmost position, the relative position between the sleeve 5 and the cylinder main body 3 is designed to be determined by the positioning means 28, 29 such that the rearmost-disposed through-hole 26A is disposed at a position facing the top portion of the circumferential wall of the cylinder main body 3. This allows bleeding of entrapped air from the pressure chamber to be conducted when the brake system is being filled with brake fluid during the oil filling operation. In this condition, the positioning means 28, 29 also function to prevent the rotation of the sleeve 5, whereby the rearmost through-hole 26A can be fixed at the ideal position during the bleeding of entrapped air from the master cylinder, thus making it possible to ensure that no air remains in the first pressure chamber 11.

In addition, the provision of the plurality of small through-holes 26A-26E instead of one large one serves to improve the mechanical strength of the sleeve and hence the durability of the master cylinder.

As is clear from the above, the first embodiment of the master cylinder according to the present invention provides the following advantages:

since plural small through-holes are provided instead of one large through-hole to establish communication between the first pressure chamber and its associated outlet port, the mechanical strength of the sleeve can be increased, and hence the durability of the master cylinder can be improved;

since the through-holes are spaced away from each other longitudinally of the sleeve, even when some of the through-holes are closed by the pistons during their movement, the communication between the first pressure chamber and the outlet port can be maintained by the remaining ones, whereby the feeding of pressurized fluid is ensured;

since the positioning means are adapted to locate the sleeve at such a position as to allow the through-hole which is adapted to establish communication between the first pressure chamber and the outlet port when the pistons come to their rearmost position to face the top portion of the circumferential wall of the cylinder main body, bleeding of entrapped air from the chambers can be effectively conducted when the brake system is being filled with brake fluid during the oil filling operation.

Figure 5:
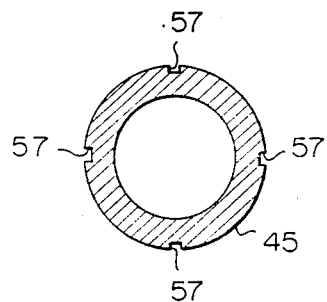
FIG. 5 is a sectional view of a second sleeve of the embodiment shown in FIG. 4.
Figure 6:
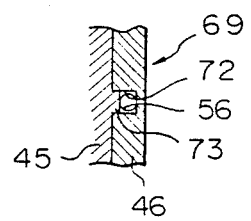
FIG. 6 is a horizontal sectional view in the longitudinal direction of the part encircled by the dotted line IV in FIG. 4.

Next, referring to FIGS. 4 to 6, a master cylinder according to a second embodiment of the present invention will be described below.

The master cylinder of the second embodiment comprises a cylinder main body 43, a first sleeve 44, a second sleeve 45, a third sleeve 46, primary and secondary pistons 47, 48 and primary and secondary cups 49, 50. The cylinder main body 43 is placed horizontally and connected to a brake booster 42. The first, second and third sleeves 44, 45, 46 are made of synthetic resin or the like, having the same inside diameter, and are disposed in that order in the cylinder main body 43, as shown in FIG. 4. The primary and secondary pistons 47, 48 are adapted to slide along the internal circumferential walls of these members. The primary and secondary cups 49, 50 are disposed, respectively, between the rear end of the second sleeve 45 and the third sleeve 46, and between the stepped portion 43a formed on the internal wall of the cylinder main body 43 and the distal end of the first sleeve 44. The primary and secondary pistons 47, 48 and the second sleeve 45 define a first pressure chamber 51, while the distal end of the cylinder main body 43 and the secondary piston 48 define a second pressure chamber 52. In addition, return springs 53, 54 for the respective pistons 47, 48 are designed to be received in holes 55a, 55b formed in the same for that purpose.

A plurality of inlet port 56 for the first pressure chamber 51 are provided on the distal end of the third sleeve 46 in such a manner as to be spaced away from each other in the circumferential direction. Grooved channels 57 are formed on the second sleeve 45 in such a manner as to communicate with their associated inlet ports 56, respectively, and a communicating chamber 58 is formed on the internal circumferential wall of the cylinder main body in such a manner as to extend along the full length thereof. These inlet ports 56 are connected to a brake fluid feed channel 60 connected in turn to a brake fluid reservoir 59 via their associated grooved channels 57 and the communicating chamber 58. On the other hand, a plurality of inlet ports 61 for the second pressure chamber 52 are provided on the first sleeve 44 in such a manner as to be spaced away from each other in the circumferential direction and are connected to a fluid feed channel 63 connected in turn to the brake fluid reservoir 59 via a communicating chamber 62 formed in such a manner as to extend along the full length of the outer circumference of the first sleeve 44.

Figure 4:
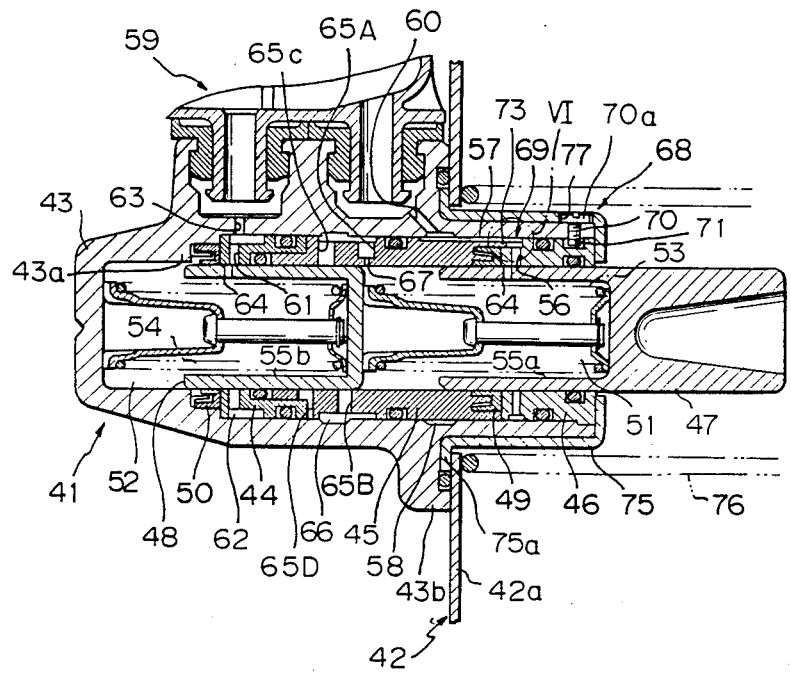
FIG. 4 is a vertical sectional view showing a second embodiment of the master cylinder according to the present invention.

These inlet ports 56, 61 are designed to communicate with their associated pressure chambers 51, 52 via small holes 64 formed in the pistons 47, 48 when the pistons 47, 48 are at their rearmost position (positions shown in FIG. 4).

Outlet ports (not shown) for connecting the respective pressure chambers 51, 52 to their associated wheel cylinder (not shown) are provided on the upper portion of the circumferential wall of the cylinder main body in such a manner as to extend therethrough. One of these outlet ports is adapted to communicate with the first pressure chamber 51 via a plurality of through-holes 65A-65D (four through-holes in this embodiment) formed in the circumferential wall of the second sleeve 45. These though-holes 65A-65D are radially formed; and the through-holes 65A, 65C and the through-holes 65B, 65D are formed at diametrically opposed positions, i.e. positions deviating from each other by 180° in the circumferential direction of the sleeve 45. These through-holes are longitudinally spaced away from each other at the respective diametrically opposed positions and are allowed to communicate with the outlet port via a communicating chamber 66 defined by the outer and inner circumferential walls of the sleeve 45 and the cylinder main body 43. The through-holes 65A/65C and 65B/65D are so positioned as not to align with each other in the longitudinal direction of the cylinder main body 43. The through-holes 65B-65D, except for the through-hole 65A which is disposed at the rearmost position (the extreme right in FIG. 4) are so disposed as to be closed by the secondary piston 48 when it comes to its normal rearmost position. The position of the rearmost through-hole 65A is slightly further to the rear than the normal rearmost position of the secondary piston 48. In addition, a constricted portion 67 of a small diameter is formed on the through-hole 65A in such a manner as to extend along part of the length thereof. This constricted portion 67 is arranged as close as possible to the rear end of the secondary piston 48 at its rearmost position. In determining the longitudinal position of the consticted portion 67, it is necessary to take accound of dimensional tolerances given to the second sleeve 45 on which the constricted portion 67 is formed, the first sleeve 44 placed adjacent to the second sleeve 45, the cylinder main body 3, the secondary piston 48 and the return spring 54. In addition, the risk of errors of assembly with respect to these components should also be taken into consideration. Therefore, in this embodiment, the constricted portion 67 is designed to be positiooned away from the rear end of the secondary piston 48 by a distance corresponding to the total of the relevant tolerances, whereby it is ensured that the constricted portion 67 is still situated rearward of the secondary piston 48 even when the distance between the internal front wall of the distal end of the cylinder main body 43 and the constricted portion 67 reaches its minimum, and when the distance between the same position of the cylinder main body 43 and the rear end of the secondary piston 45 reaches its maximum. In the second pressure chamber 52, the inside diameter of the distal end of the cylinder main body 43 is made slightly larger than the outside diameter of the secondary piston 48, whereby communication is ensured between the chamber 52 and the outlet port at all times during the movement of the secondary piston 48.

Positioning means 68, 69 are provided, respectively, between the proximate end of the cylinder main body 43 and the third sleeve 46, and between the third and second sleeves 46, 45. The positioning means disposed between the cylinder main body 43 and the third sleeve 46 comprises a screw 70 adapted to be screwed into the proximate end of the cylinder main body 43 in such a manner as to protrude radially inwardly and a recess 71 formed in the outer circumferential wall of the third sleeve 46 in such a manner as to receive therein the distal end of the screw 70. On the other hand, the positioning means 69 disposed between the third and second sleeves 46, 45 comprises, as shown in FIG. 6, an indentation 72 formed in the outer circumference of the distal end of the third sleeve 46 and a projection 73 provided on the rear end of the second sleeve 45 in such a manner as to longitudinally protrude therefrom, thereby being received in the indentation 72. Thus, the second and third sleeves 45, 46 can be positioned with respect to the circumferential direction relative to the cylinder main body 43 by these positioning means 68, 69. As shown in FIG. 4, the second sleeve 45 is oriented by these positioning means such that the through-holes 65A/65C and 65B/65D formed at the diametrically opposed positions thereon are located at such positions as to allow the respective pairs of through-holes to face the top and bottom portions of the circumferential wall of the cylinder main body 43. Since the positioning means 69 between the third and second sleeves 46, 45 is designed to be disposed close to the inlet port 56 of the third sleeve 46, the indentation 72 is formed in such a manner that part of the same communicates with the inlet port 56, and the projection 73 provided on the second sleeve 45 is brought into engagement with the indentation 72 lest the former should close the inlet port 56.

In addition, a cap 75 is mounted on the proximate end of the cylinder main body 43 to prevent displacement of the third sleeve 46, the second sleeve 45 and so forth. A flange 75a is formed on the outer circumference of this cap 75. This flange 75a is designed to be disposed between the front shell 42a of the brake booster 42 and a mounting flange 43b of the cylinder main body 43 and to be held in place at this position by means of a spring 76 installed in the brake booster 42, whereby escape of the cap 75 is prevented. A hole 77 is formed in the cap 75 for receiving therein the head 70a of the screw 70 of the positioning means 68, and this head 70a of the screw 70 is formed thin enough to ensure that the head 70a does not protrude outwardly from the hole 77.

In the master cylinder configured as described above, brake fluid in the first pressure chamber 51 is fed to its associated wheel cylinders via, firstly, the through-holes 65A-65D formed in the second sleeve 45 surrounding the same pressure chamber, and then the outlet port, while brake fluid in the second chamber 52 is fed to its associated wheel cylinders directly through the outlet port. As previously described, in this condition, the second pressure chamber 52 is in communication with the outlet port at all times, while the first pressure chamber 51 is in communication with the outlet port via the rearmost through-hole 65A in the initial stage in which the primary and secondary pistons 47, 48 are at their rearmost position. Afterwards, as the pistons 47, 48 move forward, the other through-holes 65B-65D are opened in order. On the other hand, even when the primary piston 47 is driven to its foremost position, thereby closing the rearmost through-hole 65A, the communication between the first pressure chamber 51 and the outlet port can be maintained by the through-holes 65B-65D which are disposed closer to the front end of the cylinder main body 43 than the rearmost through-hole 65A. In other words, the first pressure chamber 51 is also designed to be kept in communication with the outlet port at all times, regardless of the positions of the respective pistons 47, 48.

In the initial stage in which the primary and secondary pistons 47, 48 are at their rearmost positions, the rearmost through-hole 65A on the second sleeve 45 is designed to be located at a position facing the top portion of the circumferential wall of the cylinder main body 43 with the assistance of the positioning means 68, 69. This allows air entrapped in the pressure chamber to be bled effectively at the time of filling the brake system with brake fluid. In addition, since the constricted portion 67 is formed in the rearmost through-hole 65A which is adapted to establish communication between the first pressure chamber 51 and the outlet port at a position further to the rear than the secondary position 48, when the pistons 47, 48 are activated to send brake fluid to load the same, even if the pressure in the first chamber 51 becomes higher than that in the second chamber 52, reverse movement of the secondary piston 52 is properly prevented by virtue of the damping action generated by the resistance to flow resulting when brake fluid in the first chamber 51 is caused to pass through the constricted portion 67 by the secondary piston 48. Furthermore, should the secondary piston 48 be slightly reversed, the constricted portion 67 is closed by the secondary piston 48, thereby causing the first pressure chamber 51 to act as a damping chamber, any further reverse movement of the secondary piston 48 thus being prevented.

The secondary sleeve 45 is secured by the positioning means 68, 69, thereby consistently maintaining the through-holes 65A-65D at a position where they respectively face upward and downward at their respective diametrically opposed positions during operation of the master cylinder. This securely prevents air from being entrapped in the first pressure chamber 51.

In this embodiment, the screw 70 of the positioning means 68 is designed to be radially screwed into the cylinder main body 43. This obviates the need to provide longitudinal threaded portions on both the cylinder main body 43 and the cap 75 as in the first embodiment. With the second embodiment, any local reduction in the thickness of the cylinder main body 43 and the cap 75 is thus prevented, and an overall reduction in diameter is realized while maintaining the thickness of the relevant components at a uniform value. The space in which the brake booster 42 and the master cylinder are assembled can be reduced by decreasing the diameter of the cap 75. Furthermore, since the head 70a of the screw 70 is received in the hole 77 formed in the cap 75, the spring 76 installed in the brake booster 42 can be positioned close to the cap 75. This serves to make the overall size of the master cylinder even smaller. In addition, since the cap 75 prevents the sleeves 44-46 inserted in the cylinder main body 43 from escaping therefrom, and since the cap 75 is in turn held between the shell 42a of the brake booster 42 and the flange 43b of the cylinder main body 43, the screw 70 is hardly subjected to any external force that might be applied thereto in the longitudinal direction. Moreover, in this configuration, the screw 70 only has to bear the weight of the cap 75 when the master cylinder is disconnected from the brake booster 42. Therefore, a small screw will do for positioning purposes in terms of rigidity. The sleeves 44-46 can be dismounted from the cylinder main body 43 by loosening this screw 70.

In this second embodiment, the provision of a plurality of small through-holes 65A-65D instead of one large one, as in the first embodiment, serves to increase the mechanical strength of the second sleeve 45, thereby improving the durability of the master cylinder.

As is clear from the above, the second embodiment of the master cylinder of the present invention can provide the following advantages.

In the first embodiment shown in FIGS. 1-3, the cap is designed to be brought into meshing engagement with the external threads of the cylinder main body for preventing escape of the sleeves from the cylinder main body. This configuration requires the thickness of the threaded portion of the cylinder main body to be reduced. Consequently, the thickness of the whole cylinder main body has to be made larger in order to cope with this problem. This countermeasure tends to result in a cylinder main body having a relatively large outside diameter. Moreover, the brake booster with which the end of the master cylinder is brought into engagement also has to be designed to be ample enough in terms of space to ensure that the internal components thereof do not interfere with the cylinder main body. However, this frustrates efforts to design a smaller master cylinder.

With the second embodiment of the master cylinder of the present invention, however, since the sleeve can be located at a position which allows some of the through-holes formed therein to face the top portion of the circumferential wall of the cylinder main body, air entrapped in the first pressure chamber can be effectively bled when the brake system is filled with brake fluid. Moreover, since the sleeve can be secured during an air-bleeding operation, the location of the through-hole can be fixed at an ideal position, thus making it possible to securely expel entrapped air from the chamber.

Furthermore, since the screw of the positioning means is designed to be radially screwed into the cylinder main body, the thickness of the portion of the cylinder main body adjacent to the screw can be made uniform, local reduction in the thickness of the cylinder main body thus being prevented. Moreover, since the head of the screw is received in the hole formed in the cap, it is possible to economize on the space in which the master cylinder and the brake booster are assembled, thus making it possible to reduce the diameter of and hence the size of the master cylinder.

In addition, the arrangement in which the screw is radially screwed into the cylinder main body makes it easy to thread the relevant portion of the cylinder main body, as well as to screw tight the relevant portion when the cap is assembled to the cylinder main body. Thus, a master cylinder adopting this configuration is easy to produce.

When the brake system is filled with brake fluid, entrapped air in the chamber is sometimes bled by pumping brake fluid from the brake fluid reservoir to the chamber. During such an air-expelling operation, the pressure in the second pressure chamber may become higher than that in the first pressure chamber due to the difference in resistance to flow in the two systems extending to the respective wheel cylinders. In this condition, the secondary piston of a prior art master cylinder may happen to move to a position further to the rear than its normal rearmost position where the piston separates from the secondary cup. When the piston is driven forward again when the brake are applied after this has happened, the piston is liable to catch the secondary cup, thereby dismounting the same.

With the second embodiment of the present invention, however, even when the pressure in the second pressure chamber 52 becomes higher than that in the first pressure chamber 51 when the pistons 47, 48 are activated to send brake fluid to fill the brake system with the same, since the constricted portion 67 is formed on the rearmost through-hole 65A which is adapted to establish communication between the first pressure chamber 51 and the outlet port at a position further to the rear than the secondary piston 48, the reverse movement of the secondary piston 52 is properly prevented by virtue of the damping action generated by the resistance to flow resulting when brake fluid in the first chamber 51 is caused to pass through the constricted portion 67 by the secondary piston 48. Furthermore, should the secondary piston 48 by slightly reversed, the constricted portion 67 is closed by the secondary piston 48, thereby causing the first pressure chamber 51 to act as a damping chamber, any further reverse movement of the secondary piston 48 thus being prevented.

With the second embodiment of the master cylinder of the present invention, therefore, the following additional advantages can be provided:

since the constricted portion formed between the first pressure chamber and the outlet port is designed to function as damping means when the secondary position is at its normal rearmost position, even when the pressure in the second chamber 52 becomes higher than that in the first pressure chamber 51 when the brake system is filled with brake fluid, the reverse movement of the secondary piston 48 can be prevented by generating damping action in the first chamber 51 by virtue of the resistance to flow resulting at the constricted portion 67, displacement of a sealing cut thus being securely prevented.

Furthermore, since the secondary piston is prevented from moving further rearward beyond its normal rearmost position during the reciprocating movement thereof, no margin for the reverse movement beyond its normal rearmost position has to be taken into consideration. This makes it easy to efficiently design a master cylinder and also serves to make the overall length of the same shorter.

What is claimed is:

1. A master cylinder wherein a sleeve is provided inside a cylinder main body to define a first pressure chamber in cooperation with primary and secondary pistons, characterized in that a plurality of through-holes adapted to communicate with an outlet port are disposed in said sleeve in such a manner as to be longitudinally spaced away from each other, and that positioning means is provided between said sleeve and said cylinder main body for locating at least one of said plurality of through-holes adapted to establish communication between said outlet port and first pressure chamber when said pistons are at their rearmost positions at such a position as to allow said one of the plurality of through-holes to face the top portion of the circumferential wall of said cylinder main body.

2. A master cylinder as set forth in claim 1, characterized in that a cap is provided on the end of said cylinder main body for preventing the escape of said sleeve therefrom, that said positioning means consists of an extending member adapted to extend radially into said cylinder main body so as to lock said sleeve at the end thereof, thereby securing said sleeve, and that the head of said extending member is designed to be received in a hole formed in said cap.

3. A master cylinder as set forth in claim 1, characterized in that a pair of sealing cups adapted to be in contact with the outer circumferential surface of, respectively, said primary and secondary pistons are installed inside said cylinder main body, and that a constricted portion is formed in said one of the plurality of through-holes adapted to establish communication between said outlet port and first pressure chamber when said pistons are at their rearmost positions.

* * * * *